(12) United States Patent
Engel et al.

(10) Patent No.: US 6,253,748 B1
(45) Date of Patent: Jul. 3, 2001

(54) METHOD AND DEVICE FOR CONTROLLING AN INTERNAL COMBUSTION ENGINE

(75) Inventors: Gerhard Engel, Stuttgart; Joachim Berger, Winterbach; Manfred Birk, Oberriexingen; Manfred Strohrmann, Karlsruhe; Peter Rupp, Remseck, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/385,261

(22) Filed: Aug. 30, 1999

Related U.S. Application Data

(63) Continuation-in-part of application No. 09/305,595, filed on May 5, 1999, now abandoned.

(30) Foreign Application Priority Data

May 9, 1998 (DE) .............................................. 198 20 904

(51) Int. Cl.[7] ................................................. F02M 25/07
(52) U.S. Cl. .................. 123/568.21; 123/568.16
(58) Field of Search .......................... 123/568.11, 568.16, 123/568.21, 568.23, 568.24, 568.25, 568.26, 568.27, 568.28; 701/108

(56) References Cited

U.S. PATENT DOCUMENTS

| | | | |
|---|---|---|---|
| 4,378,776 | * 4/1983 | Nishimori | 123/568.16 |
| 4,378,777 | * 4/1983 | Iida et al. | 123/568.16 |
| 4,432,331 | * 2/1984 | Yasuhara | 123/568.16 |
| 5,508,926 | * 4/1996 | Wade | 123/568.16 |
| 5,771,869 | * 6/1998 | Yoshihara et al. | 123/568.16 |
| 5,921,224 | * 7/1999 | Sinnamon | 123/568.21 |
| 6,076,502 | * 6/2000 | Katashiba et al. | 123/568.16 |

FOREIGN PATENT DOCUMENTS 195 28 696    2/1997    (DE) .
196 20 039    11/1997    (DE) .

* cited by examiner

Primary Examiner—Willis R. Wolfe
(74) Attorney, Agent, or Firm—Kenyon & Kenyon

(57) ABSTRACT

A method and a device for controlling an internal combustion engine. An actuator serves to influence the quantity of exhaust gas recirculated. A loop controller preselects the quantity of exhaust gas to be recirculated on the basis of a setpoint and an actual value which characterizes the quantity of exhaust gas recirculated. A first measured value is determined in a first position (open) of the actuator, and a second measured value is determined in a second position (closed) of the actuator, with the actual value or a correction value being preselectable on the basis of the difference between the two measured values.

12 Claims, 7 Drawing Sheets

US 6,253,748 B1

METHOD AND DEVICE FOR CONTROLLING AN INTERNAL COMBUSTION ENGINE

CROSS-REFERENCE TO RELATED APPLICATION

This application is a continuation-in-part application of U.S. patent application Ser. No. 09/305,595 filed May 5, 1999 abandoned.

BACKGROUND INFORMATION

German Patent No. 196 200 39 describes a method and a device for controlling an internal combustion engine with an actuator for influencing the quantity of recirculated exhaust gas. An actual value is compared with a setpoint. An actuator which influences the proportion of recirculated exhaust is driven on the basis of this comparison. With the device according to the related art, the air flow rate, in particular the amount of fresh air drawn in, is used as a controlled variable. It is compared with a setpoint which depends on the operating point of the internal combustion engine. Preferably a PI actuator corrects the control deviation.

In regulating low exhaust gas recirculation rates, the proportion of fresh air is large and the proportion of recirculated exhaust is low. In regulating the amount of fresh air, even a small sensor tolerance can lead to large relative fluctuations in the amount of recirculated exhaust and thus the exhaust gas recirculation rate.

For example, if an exhaust gas mass flow rate of 50 kg/h is to be mixed with a fresh air mass flow rate of 950 kg/h, and if the sensor measuring the amount of fresh air has a tolerance of ±5%, then an actual fresh air flow rate of approximately 900 kg/h or 1000 kg/h may be measured. Since the total fresh air mass flow and exhaust gas mass flow processed through the engine remains approximately constant, this leads to a recirculated exhaust gas flow rate of 0 kg/h or 100 kg/h.

Consequently, emissions are subject to great fluctuations. The emission characteristics at a low exhaust gas recirculation rate depend greatly on the accuracy in regulating the exhaust gas recirculation rate. At low exhaust gas recirculation rates, tolerances affecting the fresh air flow rate have very little effect on the exhaust gas recirculation rate. However, changes in exhaust gas mass have a great influence on the exhaust gas recirculation rate.

An object of the present invention is to reduce emissions with a method and a device for controlling an internal combustion engine. In particular, the accuracy in regulating the exhaust gas recirculation rate and the proportion of exhaust gas recirculated is to be improved.

SUMMARY OF THE INVENTION

Emissions can be reduced with the method according to the present invention. This is accomplished by regulating the proportion of recirculated exhaust gas. This means that at low exhaust gas recirculation rates, the system tolerances which affect the fresh air flow rate have very little effect on the exhaust gas recirculation rate.

It is advantageous if a difference between a first and a second measured value is used to form an actual value for the control or to form a correction value. The first measured value is detected with the actuator opened, and the second measured value is detected with the actuator closed.

It is advantageous if the second measured value is determined when certain operating conditions prevail and is stored in a characteristics map. Therefore, only one measured value need be detected in ongoing operation.

The actual value can be calculated easily on the basis of the first measured value and the stored values for the second measured value. It is also advantageous if the values in the engine characteristics map can be adapted.

An advantageous embodiment is obtained when both measured values are detected under certain operating conditions and if correction values are determined on the basis of these measured values and stored in a characteristics map. These correction values can then be used to correct the actual value or the setpoint of the regulator.

Another advantageous embodiment provides for the control signal for the actuator to be modulated so that it assumes its first and second positions in alternation. In this embodiment, no memory is necessary for the engine characteristics map.

DETAILED DESCRIPTION

Figure 1:
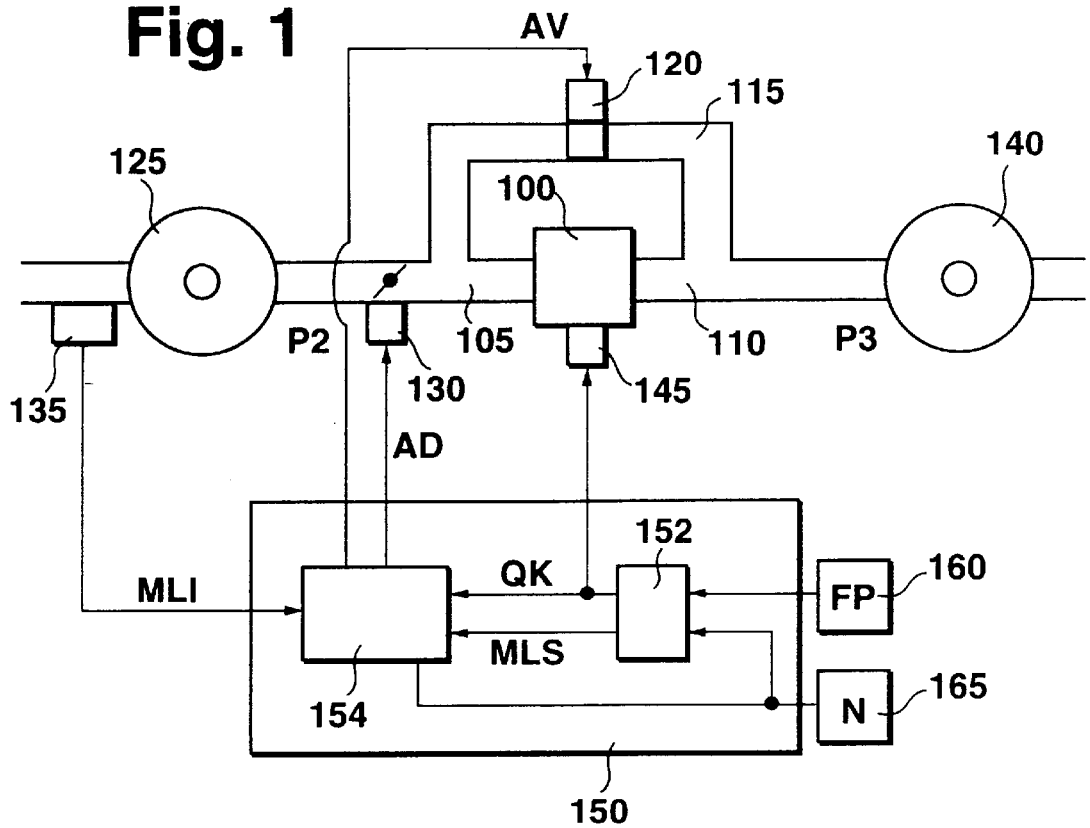
FIG. 1 shows a schematic diagram of the control according to the present invention.

FIG. 1 shows the device for controlling an internal combustion engine 100. The air goes through an inlet line 105 to internal combustion engine 100. It delivers exhaust gases through an exhaust gas line 110. A recirculation line 115 connects exhaust gas line 110 to intake line 105. An exhaust gas recirculation valve 120 is arranged in the recirculation line; it influences the amount of exhaust gas recirculated and is designated as the first final controlling element.

A compressor 125 may be arranged in intake line 105 to compress the air drawn in. Compressor 125 is driven by a turbine 140 arranged in exhaust gas line 110. The amount of fresh air intake is varied by a throttle valve actuator 130 which controls a throttle valve. Throttle valve actuator 130 is also known as the second final controlling element.

The amount of fresh air intake MLI is detected by a sensor 135 which is also known as an air flow meter.

An actuator 150 sends a control signal AD to throttle valve actuator 130, a signal QK to a fuel flow rate actuator 145 and a signal AV to exhaust gas recirculation valve 120. The exhaust gas recirculation valve includes an electropneumatic transducer, which converts control signal AV into a pneumatic force and thus into a certain position of final controlling element 120. Actuator 150 analyzes the output signals of an rpm sensor 165, a gas pedal position sensor 160, air flow meter 135 and optionally other signals from other sensors, e.g., a gas pedal position sensor 160.

Output signal FP of gas pedal position sensor 160 and rpm signal N of rpm sensor 165 are processed by a fuel mass flow control unit 152 which sends control signal QK to fuel flow actuator 145. Furthermore, fuel mass flow control unit 152 relays fuel flow signal QK and a signal MLS concerning the setpoint for the air flow rate to an exhaust gas recirculation control unit 154. Exhaust gas recirculation control unit 154 also processes output signal MLI of air flow meter 135. Exhaust gas recirculation control unit 154 supplies signal AV and signal AD.

This device then operates as follows. The fresh air supplied through intake line 105 is compressed by compressor 125. The throttle valve can be controlled by throttle valve actuator 130 so that the amount of air supplied is throttled or unthrottled on reaching internal combustion engine 100. The exhaust gases discharged through exhaust gas line 110 drive turbine 140, which in turn drives compressor 125.

Some of the exhaust goes through recirculation line 115 into intake line 105. The cross section of this recirculation line can be varied by exhaust gas recirculation valve 120, and thus the proportion of exhaust gas recirculated can be adjusted.

Fuel mass flow control unit 152 calculates a control signal QK, which determines the amount of fuel to be injected, on the basis of the driver's intention FP, which is itself determined on the basis of gas pedal position sensor 160, rpm N and optionally other operating characteristics. Fuel flow actuator 145 is driven with control signal QK. Furthermore, fuel mass flow control unit 152 delivers a setpoint MLS for the amount of fresh air. This setpoint corresponds to the desired air flow rate required for combustion of fuel quantity QK. Exhaust gas recirculation control unit 154 controls throttle valve actuator 130 and exhaust gas recirculation valve 120 so that the fuel is burned in the internal combustion engine with the lowest possible emissions.

Figure 2:
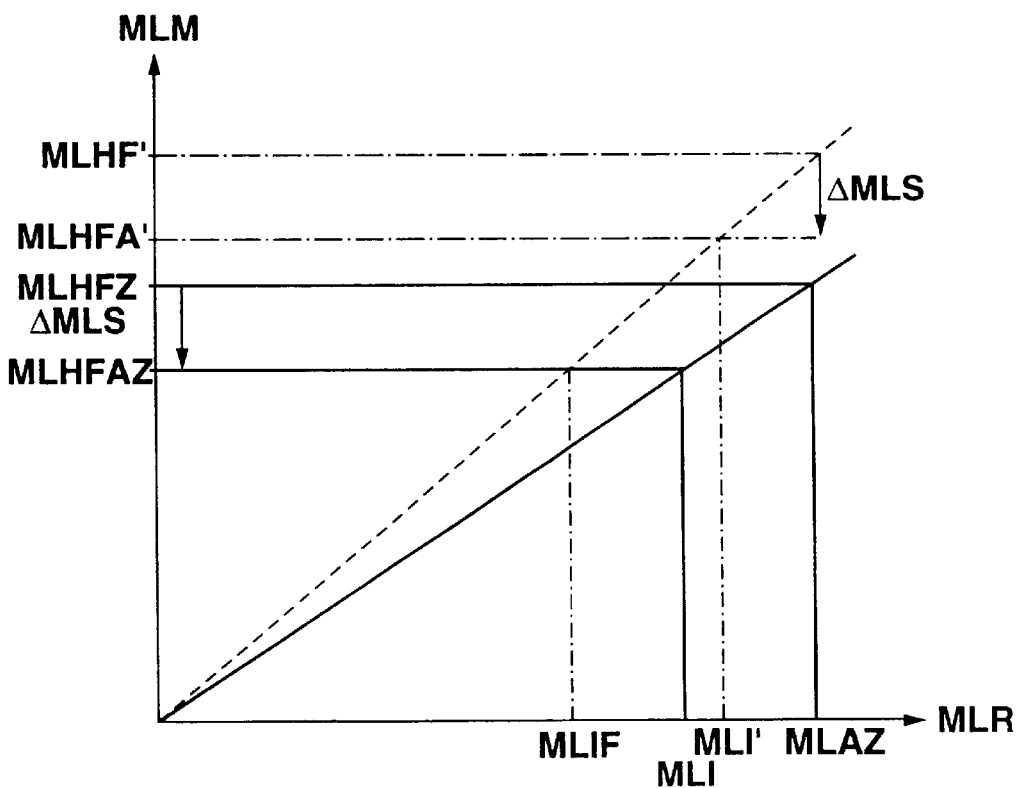
FIG. 2 shows a characteristics map representing the relationship between the air flow rate and the output signal of an air flow rate meter.

FIG. 2 shows a characteristics map plotted for air flow meter 135. Output signal MLM of air flow sensor 135 is plotted as a function of actual air flow rate MLR. A solid line shows the relationship with a tolerance-free sensor, and a corresponding dotted line shows the relationship with a sensor that is subject to tolerances. With the actuator completely closed, air flow rate MLAZ goes to the internal combustion engine. With the tolerance-free sensor, this leads to an output signal MLHFZ. These relationships are illustrated with a solid line.

If a certain air flow rate MLI is to be supplied to the internal combustion engine, with the actuator partially opened, this results in a measured value MLHFAZ. The difference between measured value MLHFZ and measured value MLHFAZ with the actuator opened is known as ΔMLS. This value ΔMLS is a measure of the air mass difference.

If the output signal of sensor 135 is set at predetermined levels with an actuator that is subject to tolerance, the air mass actually supplied will deviate significantly from the expected value. For example, if a setpoint corresponding to sensor signal MLHFAZ is predetermined, only air flow MLIF represented with a perpendicular dash-dot line is metered. This air flow MLIF is significantly smaller than expected value MLI with a tolerance-free sensor.

However, if air mass difference value ΔMLS is predetermined on the basis of sensor signal MLHF', which is obtained with the actuator closed, then air flow value MLI' is established, likewise indicated by a dash-dot line. The error in comparison with desired air flow value MLI is much smaller with this setting.

According to the present invention, the air mass difference is regulated to a predetermined setpoint. The air mass difference is determined by having the actuator completely closed occasionally, with a measured value MLHF', which is established with a closed actuator, being measured in this state. Furthermore, the actuator is occasionally brought into an opened state, in which a first measured value MLHFA' corresponding to the air flow rate with the actuator opened is measured. This variable is sent as an actual value to a control circuit and is used to form a correction value. Difference ΔMLS between these two measured values corresponds approximately to the amount of exhaust gas recirculated. This is the case when the gas throughput, consisting of fresh air and exhaust gas does not depend on the exhaust gas recirculation rate.

In a first embodiment, a modulation method is used to minimize the influence of the tolerance of sensor 135. The exhaust gas recirculation actuator is driven in alternation so that there is exhaust gas recirculation, i.e., exhaust gas recirculation valve 120 is opened, and there is no exhaust gas recirculation, i.e., the exhaust gas recirculation controlling element is closed. The resulting difference in air flow rate between this first position, where the exhaust gas recirculation valve is opened, and this second position, where the exhaust gas recirculation valve is closed, corresponds approximately to the amount of exhaust gas recirculated, because with exhaust gas recirculation, the smaller amount of gas flowing into the engine is compensated by adding exhaust gas. The control circuit is managed using the air flow difference.

Figure 3:
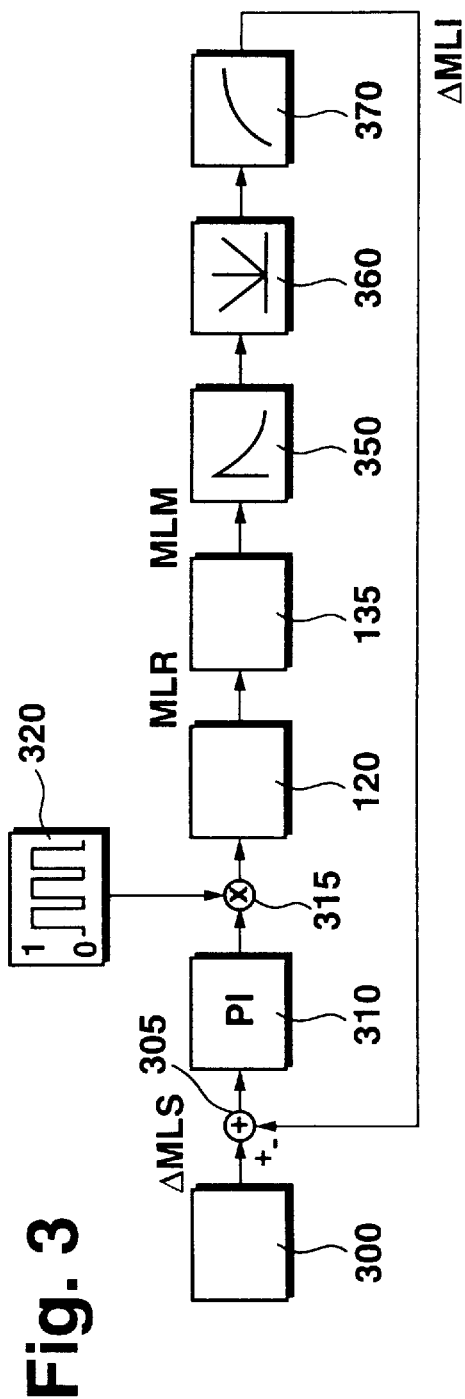
FIG. 3 shows a block diagram of a first embodiment of the present invention.

Since the air flow difference is measured with the same sensor, the sensor tolerance affects only the air flow difference, which corresponds approximately to the amount of exhaust gas recirculated. In the example cited in the preamble to the specification, this means that the amount of exhaust gas changes only by 5% of 50 kg/h, i.e., by approx. 2.5 kg/h. FIG. 3 shows a first embodiment of a corresponding control structure with a modulation method for air flow measurement.

Setpoint generator 300 preselects setpoint ΔMLS for the air mass difference on the basis of various operating characteristics (not shown). Setpoint ΔMLS for the air mass difference goes to a gate 305 at whose second input is applied actual value ΔMLI with a negative sign for the air mass difference. The output signal of gate 305 goes to a loop controller 310. Loop controller 310 is the loop controller known from the related art for regulating the exhaust gas recirculation rate. It is possible to provide means for it to drive several final controlling elements such as an exhaust gas recirculation valve and/or a throttle valve.

The output signal of the loop controller goes to a modulation point 315 at whose second input is applied the output signal of modulation setpoint 320. Modulation unit 315 links the two signals by multiplication and sends corresponding control signals to actuator 120. Depending on the control signals, a certain actual air flow MLR is established and sent to the internal combustion engine. It is detected by sensor 135 and converted into an output signal MLM. This output signal MLM of air flow sensor 135 goes through a high-pass filter 350 to a rectifier 360 and a low-pass filter 370. Actual value ΔMLI for the air mass difference is available at the output of this low-pass filter 370. Setpoint generator 300 calculates setpoint ΔMLS as a function of various operating conditions. The operating conditions taken into account include in particular injected fuel quantity QK, rpm N of the internal combustion engine or a variable corresponding to these variables plus optionally other variables. This setpoint ΔMLS is compared with actual value ΔMLI and sent to loop controller 310, which calculates from the difference a control quantity in the form of an amplitude which is multiplied by the output value of the modulation setpoint.

Modulation setpoint 320 supplies an alternating signal which oscillates between a value of 0 and a value of 1 with a frequency F. Value 0 corresponds to a manipulated variable which does not result in any exhaust gas recirculation. This means that with an exhaust gas recirculation valve, a signal causing it to remain closed is preset and no exhaust gas goes from the exhaust gas side to the fresh air side. The value of 1 results in the actuator receiving such a signal that it assumes a position resulting in the maximum exhaust gas recirculation.

Air flow rate MLR established is measured as air value MLM by actuator 135, which is subject to tolerance. The high-pass filter suppresses the zero-frequency component of the signal. Finally, actual value ΔMLI is obtained as the output signal by rectifier 360 and low-pass filter 370.

Figure 4:
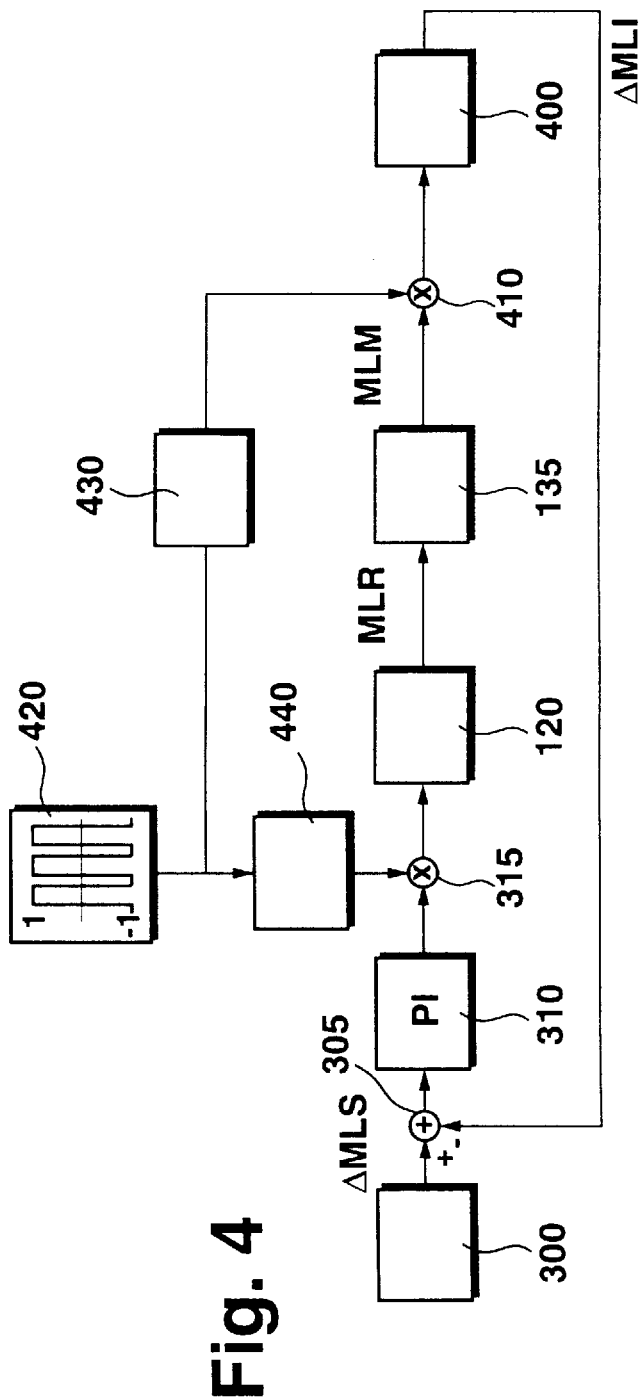
FIG. 4 shows a block diagram of a second embodiment of the present invention.

FIG. 4 shows another version of this embodiment. Elements already described in conjunction with FIG. 3 are labeled with the same reference notation here. This version differs from that in FIG. 3 essentially in the modulation or demodulation of signals. Measured value MLM of sensor 135 goes over a gate 410 to demodulation unit 400, at whose output actual value ΔMLI appears. Modulation setpoint 420 goes to a limiter 440 whose output signal goes to modulation unit 315. Furthermore, modulation setpoint 420 goes to a correction unit 430 which in turn sends a signal to gate 410.

The modulation generator supplies a signal alternating between values of −1 and +1. Limiter 440 limits the output signal of the modulation unit to values between 0 and 1. The signal is demodulated by multiplying the output signal of modulation generator 420 by the output signal of sensor 135. To do so, the output signal of modulation generator 420 is phase shifted with correction unit 430 according to the dynamics of the links. Demodulation unit 400 includes essentially a low-pass filter 370, which suppresses the high-frequency components.

According to the present invention, the loop control is based on the difference between the air values for open and closed exhaust gas recirculation valve. In other words, the difference between air values with and without exhaust gas recirculation is regulated. In the embodiments shown here, the actual value is obtained by modulation.

According to the present invention, actuator 120 is driven in cycles so that it is alternately opened and closed completely. This means that actuator 135 is controlled so that alternately there is no exhaust gas recirculation and then there is exhaust gas recirculation depending on the desired setpoint. With the actuator opened, i.e., when exhaust gas recirculation is occurring, a first measured value is detected. When the actuator is closed, i.e., when there is no exhaust gas recirculation, a second measured value is detected. The difference between the two measured values is sent as the actual value to loop controller 310.

The output signal of the loop controller is linked to the signal of modulation generator 320. Actuator 120 receives a signal with a fixed frequency and an amplitude which depends on the comparison between the actual value and setpoint.

Figure 5:
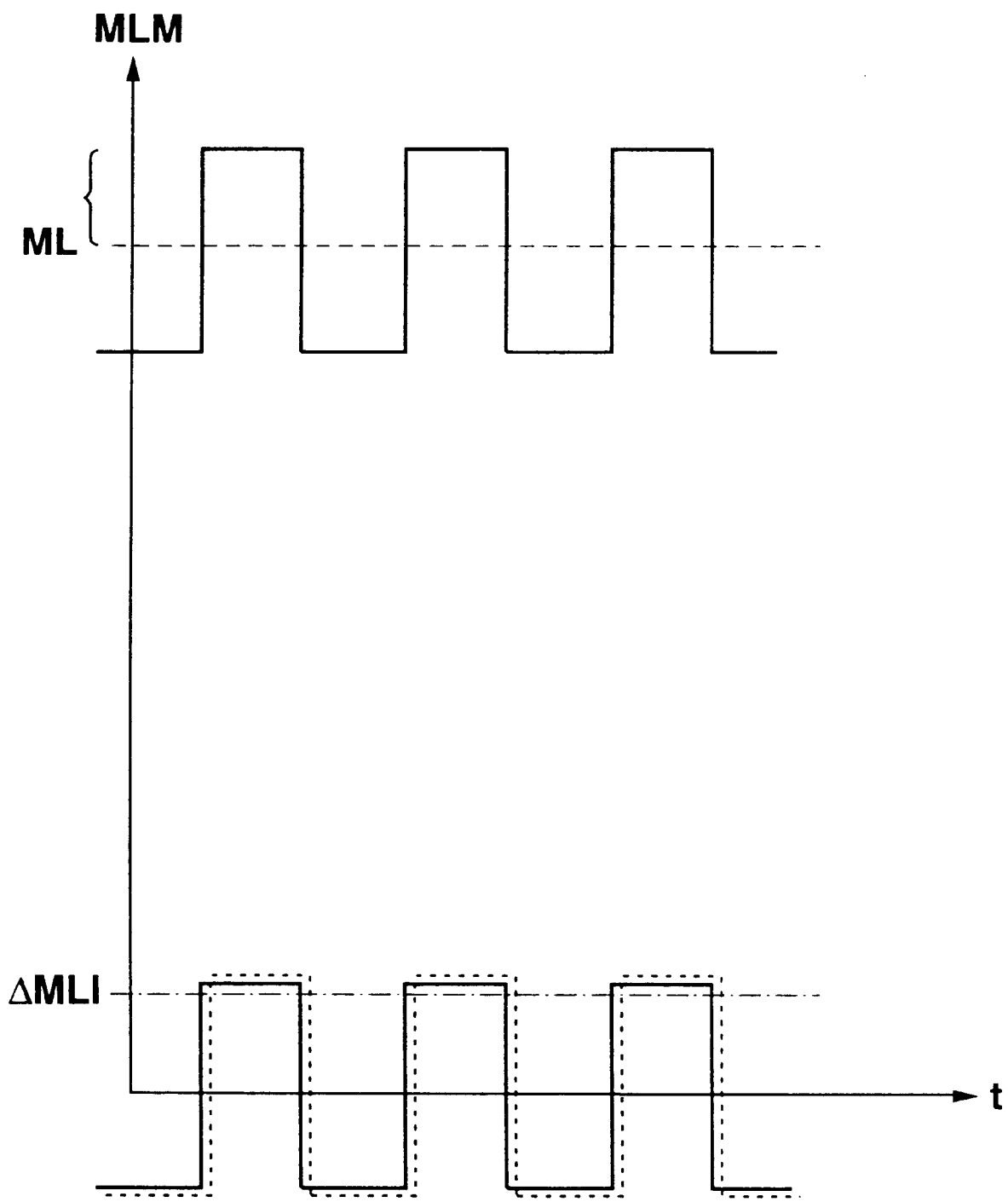
FIG. 5 shows various signals which occur with the embodiment according to FIGS. 3 and 4.

FIG. 5 shows various signals plotted over time t. First, a solid line represents the idealized output signal MLM of sensor 135. This signal oscillates about a mean ML, corresponding to the air flow rate to be established, depending on the frequency of the signal of modulation setpoint 320. This signal has a considerable zero-frequency component corresponding to air flow rate ML. The zero-frequency component is filtered out by high-pass filter 350. The signal represented by a solid line and a dotted line is available at the output of high-pass filter 350. This signal is sent to rectifier 360, which rectifies the signal. Low-pass filter 370 which is connected to it equalizes fluctuations. Signal ΔMLI which is shown with a dash dot line is available at the output of the rectifier or low-pass filter 370.

Additional embodiments of the present invention are shown in FIGS. 6a, 6b, 6c, 6d and 7. The air mass difference is also used as a control variable in the embodiments according to FIGS. 6a and 6b. In the embodiment according to FIG. 7, the control variable is the air flow rate, with the air flow rate setpoint being corrected accordingly.

Figure 6A:
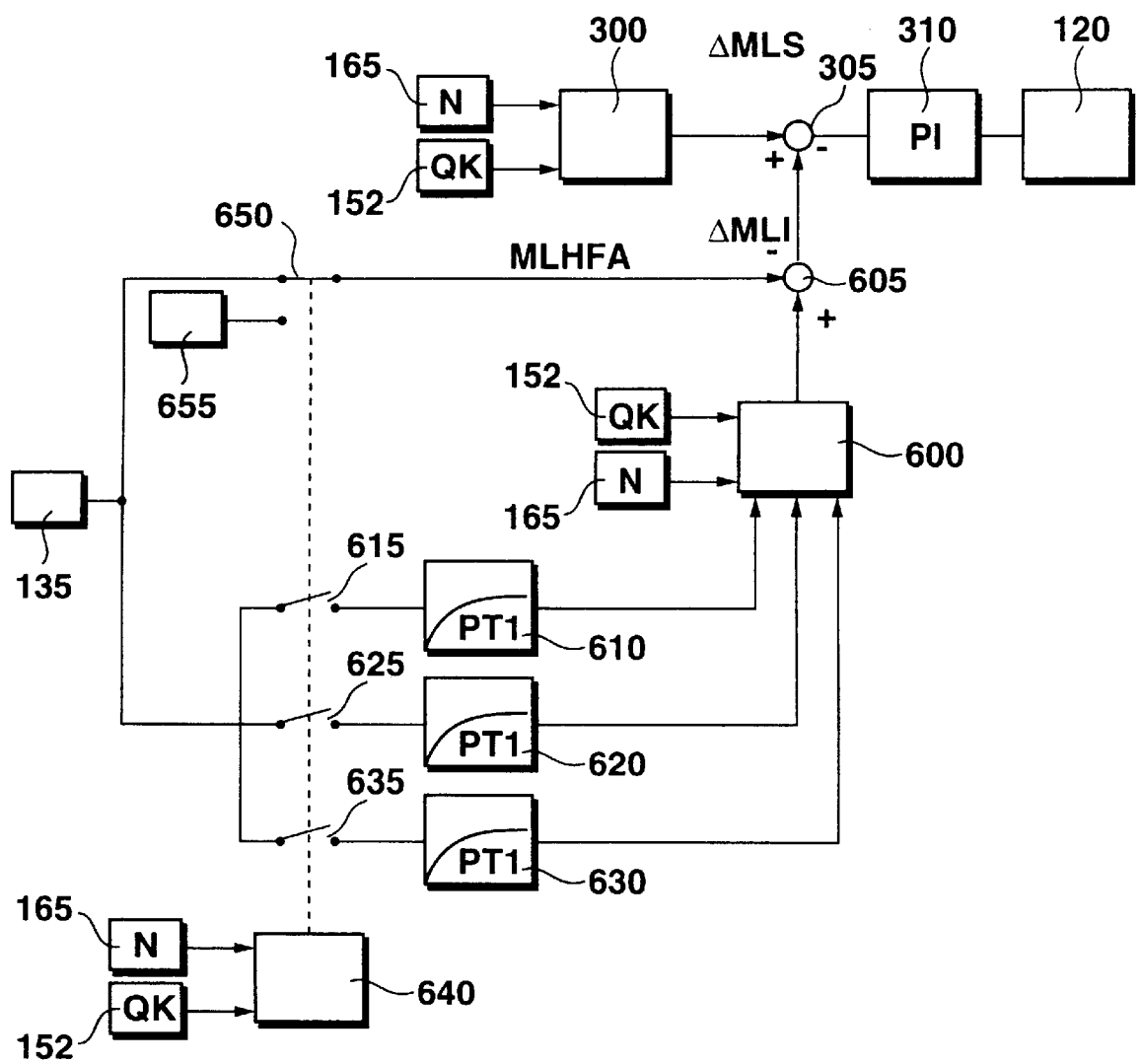
FIG. 6a shows another embodiment of the device according to the present invention.

In steady-state operation in particular, when the operating point does not change often, a simplified method as illustrated in FIG. 6a can be used. However, this method is also used in dynamic operation. The adaptation values are learned in steady-state operation and are used in all operating states.

Air flow value MLHFZ with the exhaust gas recirculation valve closed, i.e., without exhaust gas recirculation, is measured and stored suitably. In normal operation, only air flow value MLHFZ is measured in states with exhaust gas recirculation.

Then value ΔMLI is determined for the air mass difference from measured value MLHFA and stored values MLHFZ. It is especially advantageous if values for air flow rate MLHFZ without exhaust gas recirculation are measured at several operating points. Several operating points and the corresponding air flow rate values define interpolation points in at least one or two planes. The values are preferably adapted using engine characteristics map adaptation. Such a method is described in German Patent No. 195 28 696. Air flow values MLHFZ learned at three or four operating points for a closed exhaust gas recirculation valve cover a range of one or two planes above the values for fuel mass QK and rpm N. The plane yields values for the air mass with closed exhaust gas recirculation for all QK and N operating points.

One version of this embodiment is shown in FIG. 6a. Elements described in conjunction with previous figures are labeled with the same reference notation here. The output signal of sensor 135 goes via switching means 650 to gate 605. Switching means 650 optionally connects the output signal of sensor 135 or the output signal of a constant value setpoint 655 to gate 605. Output signal 135 also goes via a switching means 615 to a first PT1 element 610, via a switching means 625 to a second PT1 element 620 and via another switching means 635 to a third PT1 element 630. PT1 elements 610, 620 and 630 send signals to a characteristics map 600. In addition, the output signal of rpm sensor 165 and output signal QK of flow rate setpoint 152 are also supplied to engine characteristics map 600.

Switching means 615, 625, 635 and 650 are controlled by a logic unit 640. The logic unit processes the signals of the rpm sensor 165 and flow rate setpoint 152 in particular.

This device functions as follows. The difference between setpoint ΔMLS and actual value ΔMLI for the air mass difference is sent to loop controller 310 accordingly, as in the embodiments according to FIGS. 3 and 4. Actual value ΔMLI for the air mass difference is determined on the basis of the difference between the output signal of sensor 135 and value MLEB stored in engine characteristics map 600.

Engine characteristics map value MLEB corresponds to the air flow value established without exhaust gas recirculation under the present operating conditions. Value MLHFA is the value for the air flow rate established with exhaust gas recirculation. On the basis of these two values, value ΔMLI is obtained as the difference for the instantaneous air mass difference. Air flow value MLHFZ, which would be established without exhaust gas recirculation, i.e., with the exhaust gas recirculation valve closed, is read out of engine characteristics map 600.

It is especially advantageous if engine characteristics map 600 is implemented as follows. One operating point and one air flow value define one point of a plane. Three such operating points with the respective air flow values define three interpolation points which in turn define a plane. If one of these three interpolation points is present, the respective air flow value is detected. An air flow value is assigned to each operating point using this plane. An operating point is preferably defined by the rpm of the internal combustion engine and injected fuel quantity QK.

Logic unit 640 detects on the basis of rpm N and injected fuel quantity QK which operating state prevails. If none of the operating states that define an interpolation point of the plane is found, switching means 615, 625, 635 and 650 are controlled so as to assume the positions shown in FIG. 6a.

This means that the measured air flow value goes directly to gate 605 and then via gate 305 to loop controller 310 for the exhaust gas mass. Engine characteristics map 600 calculates corresponding air flow rate MLEB which would be obtained if the exhaust gas recirculation valve were closed on the basis of the operating state defined by rpm N and injected fuel quantity QK. Gate 605 links these two signals and forms an actual value ΔMLI for the air mass difference.

If the prevailing operating state corresponds to an interpolation point of the engine characteristics map, then corresponding switching means 615, 625 or 635 is switched to its closed state, and switching means 650 is switched to its opened state, where gate 605 is connected to setpoint 655. The measured air flow value is used for adaptation. Air flow values measured with the exhaust gas recirculation valve closed are filtered with respective PT1 element 610, 620 or 630 around the respective interpolation point.

In this case, the interpolation point for engine characteristics map 600 is recalculated and/or the engine characteristics map is adapted. If this is the case, either the output signal of loop controller 310 remains constant, or the control deviation, i.e., the input signal of loop controller 310, becomes 0, the air flow value becomes large so that the loop controller closes the actuator for exhaust gas recirculation, and there is no exhaust gas recirculation, or several of these possibilities may exist concurrently. The value of the PT1 element for the respective interpolation point is frozen on leaving the respective operating range, i.e., it is stored. This value is the air flow value learned for this operating point for the closed exhaust gas recirculation valve.

Logic unit 640 switches the air flow rate signal of sensor 135 either to a control branch to which switching means 650 is connected or to an adaptation branch at which switching means 650 is opened and at least one of switching means 615, 625 or 635 is closed. The control branch subtracts measured air flow value MLHFA from comparison value MLEB which is calculated from the plane stored in engine characteristics map 600 as a function of the injected fuel quantity and the rpm. The actual value of the air mass difference obtained in this way is compared with a setpoint ΔMLS which depends on the operating point and is sent to loop controller 310.

It is especially advantageous for a plurality of interpolation points to be provided instead of three interpolation points. Thus, for example, different planes may be defined in different operating ranges.

Figure 6B:
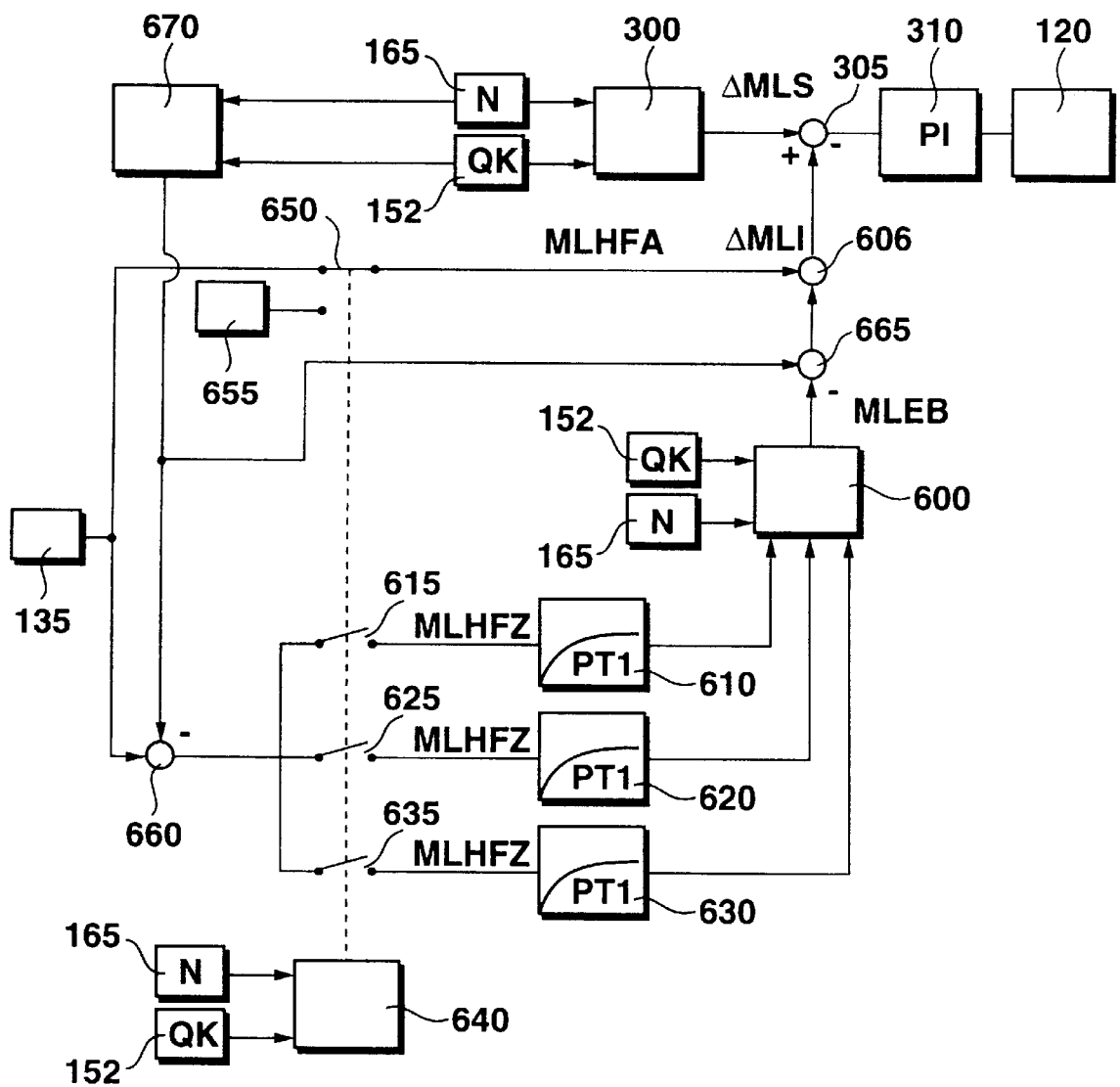
FIG. 6b shows yet another embodiment of the device according to the present invention.

An especially advantageous version of the preceding embodiment is illustrated in FIG. 6b. A disadvantage of the embodiment in FIG. 6a is that the air mass can be learned only linearly via quantity QK and rpm N in engine characteristics map 600. In the version of the present invention according to FIG. 6b, a difference in comparison with a usual air mass flow is stored. This usual air mass flow is stored in engine characteristics map 670 as a function of fuel quantity QK and rpm N.

The version according to FIG. 6b differs from that in FIG. 6a in that the output signal of sensor 135 goes to switching means 615, 625 and 635 via a gate 660, and output signal MLEB of engine characteristics map 600 goes over a gate 665 to gate 606 which corresponds to gate 605 in FIG. 6a.

This means that before adaptation, the usual air flow rate is subtracted from the measured air flow rate value. Only the difference in comparison with the usual air flow rate is adapted and stored in engine characteristics map 600.

It is especially advantageous here that the output signal of engine characteristics map 670 can be corrected on the basis of various parameters. These include, for example, various temperature and pressure values.

The values for the usual air mass flow are stored in characteristics map 670 as a function of fuel quantity QK and rpm N. Further operating conditions are not taken into account. The air flow rate essentially depends on pressure P and temperature T of the air. It is advantageous if the output signal of characteristics map 670 is corrected as a function of temperature T and pressure P.

In internal combustion engines which include a supercharger, the supercharging pressure and the supercharging air temperature should be considered. In internal combustion engines which does not include a super charger, the temperature and the pressure of the drawn-in air are used. In this way, the current values can be taken into account in determining the usual air flow rate.

Figure 6C:
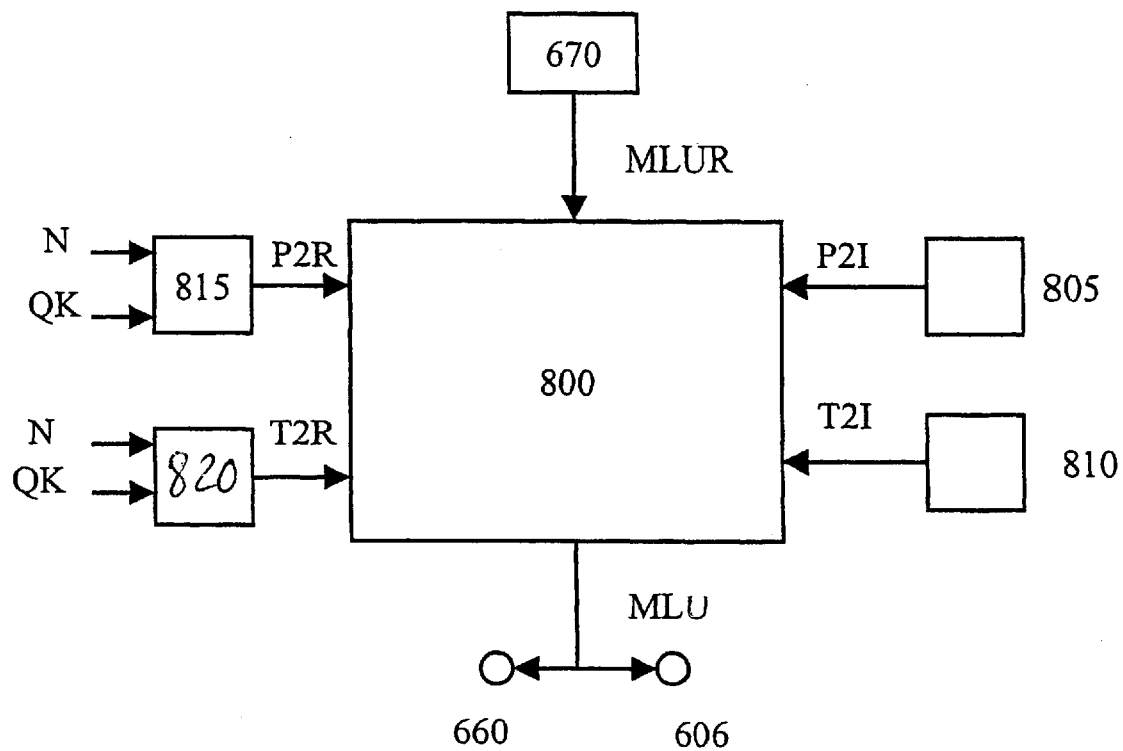
FIG. 6c shows a first embodiment of an arrangement for determining an air flow rate using a characteristics map illustrated in FIG. 6b.
Figure 6D:
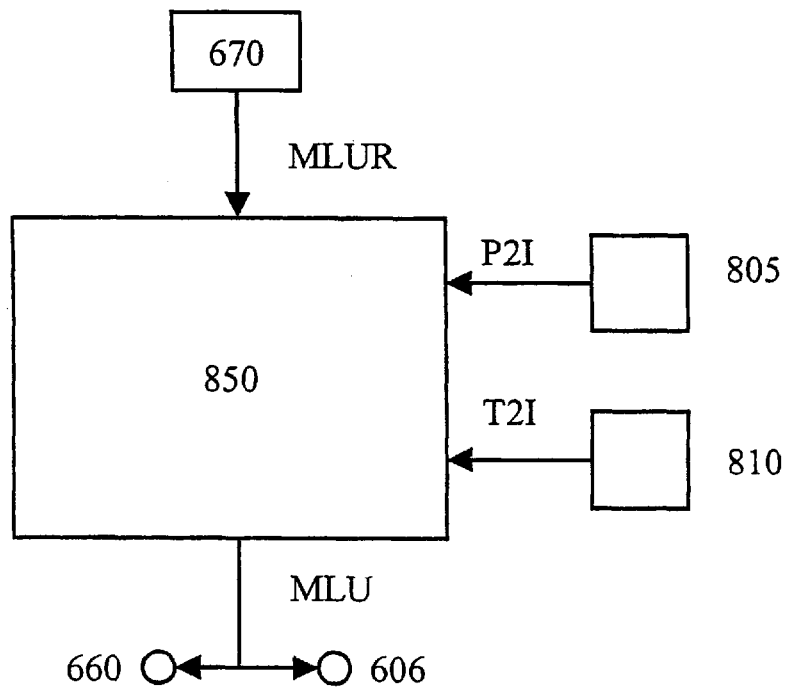
FIG. 6d shows a second embodiment of the arrangement for determining the air flow rate using the characteristics map illustrated in FIG. 6b.

Two exemplary embodiments of this correction of the characteristic map 670 are shown in FIGS. 6c and 6d.

Elements already shown in FIGS. 6a and 6b are designated using the same reference numerals. An output signal MLUR of characteristics map 670 arrives at a calculation device 800, which transmits a value MLU for the usual air flow rate to gates 606 and 660. Using a first sensor 805, the actual pressure P2I is determined, and using a second sensor 810, the actual temperature T2I of the air supplied to the internal combustion engine is determined. In this context, either in the supercharging air temperature, the supercharging air pressure, or the pressure and the temperature of the drawn-in air are measured.

A first setpoint entry 815 determines a reference pressure P2R as a function of rpm N and/or fuel quantity OK. A second setpoint entry 820 determines a reference temperature T2R as a function of the rpm N and/or fuel quantity OK. Reference pressure P2R and reference temperature T2R are pressure values and temperature values, at which characteristics map 670 was calculated.

Values P2I, T2I, P2R, and T2R are provided to calculation device 800. Calculation device 800, using a mathematical equation which utilizes values P2I, T2I, P2R, and T2R, calculates the actual usual air flow rate MLU.

In this context, the following formula can be used, corresponding to the ideal gas equation:

$$MLU=MLUR+(T2R*P2I)/(T2I*P2R)$$

This means on the basis of the characteristics map value of characteristics map 670, current temperature T2I, current pressure P2I, and temperature values T2R and pressure values P2R, for which the characteristics map provides the exact values, the usual air flow rate MLU is calculated. In place of the ideal gas equation, other formulas can also be used.

Another embodiment of the correction of correction device 800 is shown in FIG. 6d. In this embodiment, value MLU is not calculated, but rather obtained from a characteristics map 850. For this purpose, characteristics map 850 receives output signal MLUR from characteristics map 670 and signals P2I and T2I from first and second sensors 805, 810. Characteristics map 850 then loads gates 606 and 660 with signal MLU.

In characteristics map 850, actual usual air flow rate MLU is stored as a function of the reference air flow rate MLUR, supercharging pressure P2I and supercharging air temperature T2I. As an alternative to the supercharging air temperature and the supercharging pressure, the temperature and the pressure of the drawn-in air quantity can also be used. It is advantageous if reference values P2R and T2R are also provided to and utilized by characteristics map 850 as input variables, or that the difference between the measured values P2I, T2I and reference values P2R, T2R enters into characteristics map 850 as input variables.

This means on the basis of the characteristics map value of characteristics map 670, current temperature T2I, current pressure P2I, and temperature values T2R and pressure values P2R, for which characteristics map 670 provides the exact values, the usual air flow rate MLU is determined, i.e., read out from characteristics map 850.

It is also especially advantageous if the correction in gate 606 is performed by multiplication and/or addition. In other words, a multiplicative factor is stored in the engine characteristics map for the correction.

Figure 7:
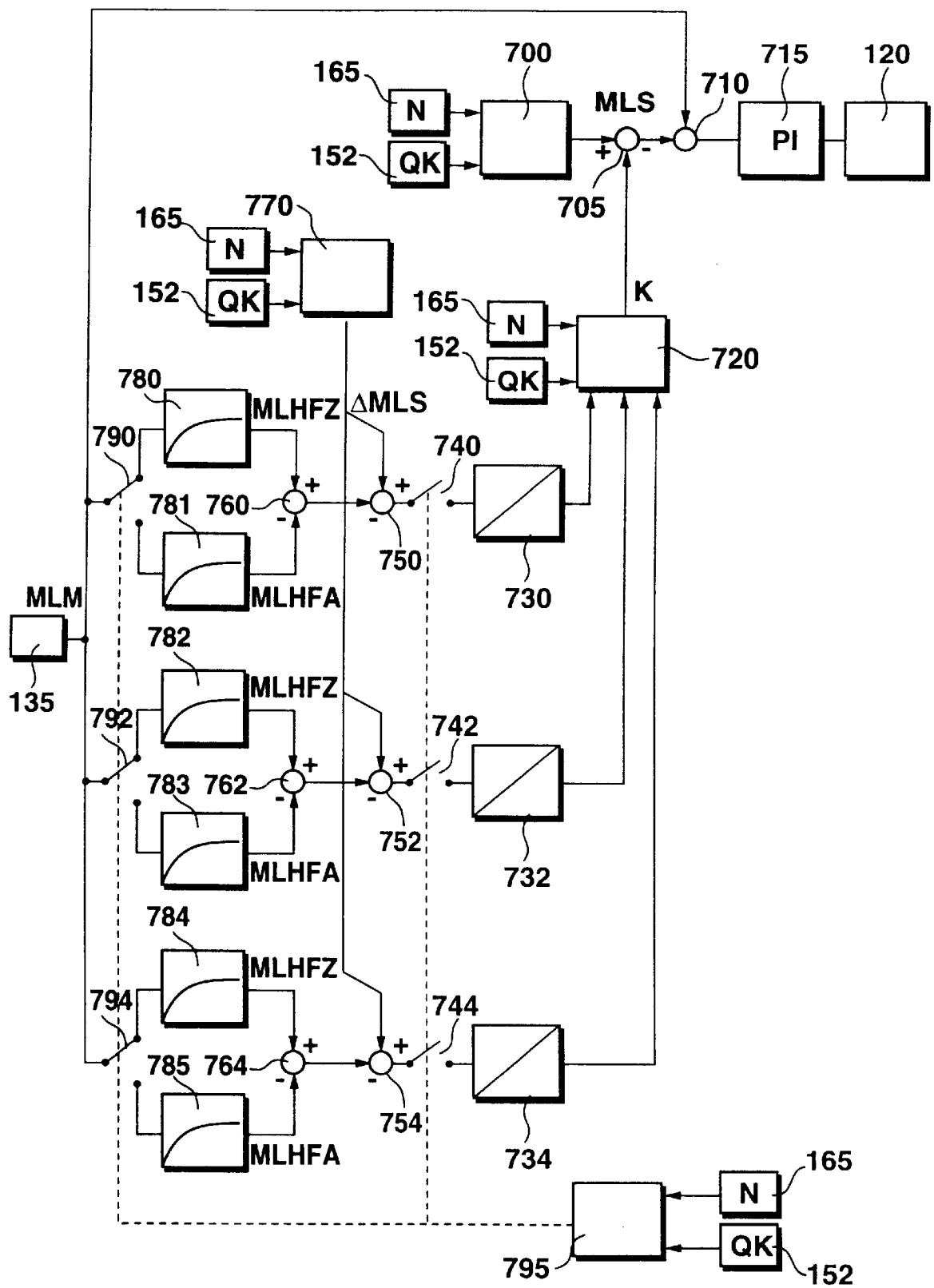
FIG. 7 shows still another embodiment of the device according to the present invention.

Another embodiment of the method according to the present invention is shown in FIG. 7. Elements described previously are labeled with the same reference notation. A setpoint generator 700 analyzes the signals of rpm sensor 165 and fuel flow setpoint 152. Setpoint generator 700 corresponds to setpoint generator 300. In contrast with setpoint generator 300, setpoint generator 700 establishes a setpoint for air flow rate MLS, which goes over gate 705 to another gate 710. The output signal of gate 710 goes to a loop controller 715, which corresponds essentially to loop controller 310.

A correction value K, which is supplied by a correction characteristics map 720, is available at the second input of gate 705. An output signal MLM of air flow rate meter 135 is available at the second input of gate 710.

The output signal of air flow meter 135 also goes via a switching means 790 to a PT1 element 780, to a PT1 element 781 or it is not relayed further. It goes from PT1 elements 780 and 781 to a gate 760. The two signals are subtracted one from the other in gate 760 and they go as variable ΔMLI to another gate 750 at whose second input the output signal of a setpoint generator 770 is applied. This setpoint generator 770 also corresponds to setpoint generator 300 and supplies an output signal with regard to the setpoint for the air mass difference.

The output signal of air flow meter 135 also goes via a switching means 792 to a PT1 element 782, to a PT1 element 783 or it is not relayed further. From PT1 elements 782 and 783 it goes to a gate 762. The two signals are subtracted, one from the other, in gate 762 and go as variable ΔMLI to additional gate 750, at whose second input the output signal of a setpoint generator 770 is applied.

The output signal of air flow meter 135 also goes via a switching means 794 to a PT1 element 794, to a PT1 element 795 or it is not relayed further. From PT1 elements 784 and 785 it goes to a gate 764. The two signals are subtracted, one from the other, in gate 764 and go as variable ΔMLI to additional gate 750, at whose second input the output signal of a setpoint generator 770 is applied.

The output signal of gate 750 goes via a switching means 740 to a loop controller 730, which in turn sends signals to correction field 720.

Switching means 790, 792, 794, 740, 742 and 744 are controlled by a logic unit 795 as a function of operating characteristics such as the rpm and injected fuel quantity OK.

In this embodiment, the air flow rate is used as the control variable. One difference in comparison with the related art is that, as shown in FIG. 7, the air flow rate setpoint is modified on the basis of at least one correction plane 720. Instead of the air flow rate setpoint, the actual value for the flow rate can also be modified accordingly as an alternative, or the control deviation, i.e., the input signal of PI actuator 715, can be modified.

The minimum of one correction plane is determined by at least three interpolation points. The interpolation points are the result of the setpoint for the air mass difference regulated by a loop controller having integral action at least. The setpoints for this control are preset by engine characteristics map 770. The actual value of the air mass difference is determined from the air flow values with the exhaust gas recirculation valve open and with it closed.

The correction values are determined as follows. When one of the three operating points defining an interpolation point of engine characteristics map 720 is reached, corresponding switching means 790 and 740, 792 and 742, 794 and 744 are controlled so that the corresponding adaptation branch is active. The deviation in air mass difference ΔMLI from its setpoint ΔMLS is determined in gate 750, 752, 754. Corresponding loop controller 730, 732 or 734 determines a correction value K which is stored in engine characteristics map 720. Then the setpoint, the actual value or the control deviation of the air mass flow actuator is corrected with this correction value.

Logic unit 795 determines, as a function of at least rpm N and injected fuel quantity QK, when switching means 790, 792, 794 are controlled in order to measure the air flow rate value for the open exhaust gas recirculation valve and for the closed exhaust gas recirculation valve. Furthermore, the logic unit determines when switching means 740, 742 and 744 are to be activated to determine the values for the interpolation points and which integrator 730, 732 and 734 is active.

Gate 710 determines the control deviation for the air flow rate on the basis of air flow rate MLM measured by the air flow meter and setpoint MLS selected by setpoint generator 700. On the basis of this control deviation, loop controller 715, which preferably has proportional and integral (PI) action, forms a control signal for controlling actuator 120.

With all these embodiments, additional or other operating characteristics can be used in addition to or instead of operating characteristics rpm N and fuel quantity QK. It is advantageous to use variables which correspond to and/or depend on the quantity of fuel injected and/or the rpm.

What is claimed is:

1. A method for controlling an internal combustion engine, comprising the steps of:
    determining a first measured value in a first, opened position of an actuator;
    determining a second measured value in a second, closed position of the actuator;
    determining one of an actual value and a correction value as a function of a difference between the first and second measured values, the actual value indicating a quantity of exhaust gas recirculated;
    comparing the actual value with a setpoint value; and
    determining a control quantity as a function of the comparison to control the actuator, the actuator influencing the quantity of gas recirculated.

2. The method according to claim 1, wherein the second measured value is determined in particular operating states, and further comprising the step of storing the second measured value in a characteristics map.

3. The method according to claim 1, wherein the difference between the first and second measured values is read out of an engine characteristics map in accordance with operating characteristics, and wherein the difference is used as the actual value.

4. The method according to claim 1, wherein the first and second measured values are determined in particular operating states, and further comprising the step of storing correction values in a characteristics map as a function of a comparison of the first and second measured values.

5. The method according to claim 1, further comprising the step of reading out of an engine characteristics map correction values for correcting one of the setpoint value and the actual value of the actuator as a function of an operating state, the actuator being an air flow rate actuator.

6. The method according to claim 1, further comprising the step of controlling the actuator in cycles such that the actuator assumes the first and second positions in alternation.

7. The method according to claim 1, further comprising the step of determining a signal as a function of the comparison between the actual value and the setpoint value, the signal having a fixed frequency and an amplitude depending on the comparison.

8. The method according to claim 1, further comprising the step of determining, as a function of the comparison between the actual value and the setpoint value, a factor by which an output signal of a modulation generator is multiplied.

9. The method according to claim 1, further comprising the step of providing a signal having a fixed frequency and an amplitude, using a signal generator.

10. The method according to claim 1, wherein the actual value is determined as a function of a pressure of air in the internal combustion engine and a temperature in the air.

11. A device for controlling an internal combustion engine, comprising:
    means for determining a first measured value in a first, opened position of an actuator;
    means for determining a second measured value in a second, closed position of the actuator;
    means for determining one of an actual value and a correction value as a function of a difference between the first and second measured values, the actual value indicating a quantity of exhaust gas recirculated;
    means for comparing the actual value with a setpoint value; and
    a loop controller for determining a control quantity as a function of the comparison to control the actuator, the actuator influencing the quantity of gas recirculated.

12. The device according to claim 11, wherein the actual value is determined as a function of a pressure of air in the internal combustion engine and a temperature in the air.

* * * * *